US009833064B2

(12) United States Patent
 Demski (10) Patent No.: US 9,833,064 B2
(45) Date of Patent: Dec. 5, 2017

(54) KEYBOARD MOUNTING ASSEMBLY

(71) Applicant: Gamber-Johnson LLC, Stevens Point, WI (US)

(72) Inventor: Brian Michael Demski, Stevens Point, WI (US)

(73) Assignee: GAMBER-JOHNSON LLC, Stevens Point, WI (US)

( * ) Notice: Subject to any disclaimer, the term of this patent is extended or adjusted under 35 U.S.C. 154(b) by 0 days.

(21) Appl. No.: 14/807,540

(22) Filed: Jul. 23, 2015

(65) Prior Publication Data

US 2017/0020281 A1   Jan. 26, 2017

(51) Int. Cl.
  *A47B 21/03*  (2006.01)
  *B60R 11/02*  (2006.01)
  *B60R 11/00*  (2006.01)

(52) U.S. Cl.
  CPC ...... *A47B 21/0314* (2013.01); *B60R 11/0252* (2013.01); *A47B 2021/0321* (2013.01); *B60R 2011/0085* (2013.01)

(58) Field of Classification Search
  CPC ............... A47B 21/0314; A47B 21/04; A47B 2021/0321; B60R 11/0252
  USPC ..... 108/7, 8, 50.02; 292/137, 163, 170, 174, 292/DIG. 37; 70/63, 78, 85, 160–162, 70/DIG. 20; 248/551, 553, 447.2, 457, 248/242, 346.03, 346.06, 918, 222.51, 248/680, 681, 118.1
  See application file for complete search history.

(56) References Cited

U.S. PATENT DOCUMENTS

| | | | |
|---|---|---|---|
| 756,486 A | | 4/1904 | Fleming |
| 3,919,866 A | * | 11/1975 | Lipschutz ............... E05B 17/04 292/170 |
| 4,467,727 A | | 8/1984 | Strommer |
| 4,890,559 A | | 1/1990 | Martin |
| D320,928 S | | 10/1991 | Boscacci et al. |
| 5,092,652 A | | 3/1992 | Macaluso |

(Continued)

OTHER PUBLICATIONS

Datalux Press Release, Datalux Corporation Introduces New Tracer, Sep. 9, 2008, 2 pgs.

(Continued)

*Primary Examiner* — Stanton L Krycinski
*Assistant Examiner* — Guang H Guan
(74) *Attorney, Agent, or Firm* — Michael Best & Friedrich LLP (57) ABSTRACT

A keyboard mounting assembly includes a base having a base upper surface and a downwardly-extending base skirt adjacent at least one side of the base upper surface. The base skirt has a recessed portion offset inwardly from the peripheral edge of the base upper surface and formed underneath the base upper surface. The assembly further includes a keyboard tray having a support portion configured to support a keyboard. The support portion has a tray upper surface and a downwardly-extending tray skirt extending along at least a portion of one peripheral edge of the tray upper surface. The tray skirt has a projection extending inwardly from an interior surface of the tray skirt and configured for receipt within the recessed portion of the base skirt when the base is coupled to the keyboard tray. The assembly further includes an interlock mechanism between the base and the keyboard tray.

11 Claims, 6 Drawing Sheets

(56) References Cited

U.S. PATENT DOCUMENTS

| | | | | |
|---|---|---|---|---|
| 5,141,196 | A | * | 8/1992 | Arnold .................... F16M 11/10 248/126 |
| 5,154,456 | A | * | 10/1992 | Moore ................ E05B 73/0082 248/552 |
| 5,177,665 | A | * | 1/1993 | Frank .................. B60R 11/0252 108/44 |
| 5,314,162 | A | * | 5/1994 | Kelley ................ E05B 73/0082 248/551 |
| 5,375,800 | A | | 12/1994 | Wilcox et al. |
| 5,386,785 | A | | 2/1995 | Naor |
| 5,415,955 | A | * | 5/1995 | Kobayashi .......... H01M 2/1055 429/100 |
| 5,487,521 | A | | 1/1996 | Callahan |
| 5,611,650 | A | | 3/1997 | Perkins et al. |
| 5,615,250 | A | * | 3/1997 | Kobayashi ............ G06K 7/0021 379/357.01 |
| 5,621,618 | A | * | 4/1997 | Komiyama .......... H01M 2/1022 361/732 |
| 5,697,233 | A | | 12/1997 | Albert et al. |
| 5,751,546 | A | * | 5/1998 | Clark .................... G06F 1/1616 361/679.43 |
| 5,751,548 | A | * | 5/1998 | Hall ........................ F16C 11/10 248/122.1 |
| 5,835,344 | A | * | 11/1998 | Alexander ............. G06F 1/1628 206/320 |
| 5,859,762 | A | * | 1/1999 | Clark .................... F16M 11/10 248/122.1 |
| 5,903,132 | A | * | 5/1999 | Ohira .................. H04M 1/0262 320/107 |
| 5,941,618 | A | | 8/1999 | Cheng |
| 6,038,983 | A | | 3/2000 | Lendl |
| 6,148,739 | A | | 11/2000 | Martin |
| 6,199,809 | B1 | | 3/2001 | Hung |
| 6,260,486 | B1 | | 7/2001 | Boos et al. |
| 6,279,800 | B1 | | 8/2001 | Lee |
| 6,336,618 | B1 | | 1/2002 | Barber |
| 6,343,775 | B1 | | 2/2002 | Jones et al. |
| 6,375,026 | B1 | * | 4/2002 | Sheldrake ............ H04M 1/0249 220/4.02 |
| 6,382,580 | B1 | | 5/2002 | Wisniewski |
| 6,505,797 | B1 | * | 1/2003 | Dempsey ................ F16M 13/00 248/166 |
| 6,585,212 | B2 | | 7/2003 | Carnevali |
| 6,760,596 | B1 | | 7/2004 | Fiorini et al. |
| 6,814,377 | B2 | | 11/2004 | Silverman et al. |
| 6,905,102 | B2 | | 6/2005 | Lin |
| 6,926,244 | B1 | | 8/2005 | O'Neill |
| 7,007,912 | B1 | | 3/2006 | Giuliani et al. |
| 7,086,634 | B1 | * | 8/2006 | Kirchhoff .......... A47B 21/0314 248/286.1 |
| 7,175,152 | B2 | | 2/2007 | Dittmer |
| 7,317,613 | B2 | | 1/2008 | Quijano et al. |
| 7,417,855 | B2 | * | 8/2008 | Carnevali ............. G06F 1/1632 312/223.1 |
| 7,426,108 | B2 | * | 9/2008 | Carnevali ............. G06F 1/1632 361/679.41 |
| 7,562,852 | B2 | | 7/2009 | Wang |
| 7,571,522 | B2 | | 8/2009 | Carnevali |
| 7,575,205 | B2 | | 8/2009 | Kirchhoff |
| 7,673,838 | B2 | | 3/2010 | Oddsen, Jr. et al. |
| 7,823,844 | B2 | | 11/2010 | Carnevali |
| 7,841,569 | B2 | | 11/2010 | Mileos et al. |
| 7,918,427 | B2 | * | 4/2011 | Wang ...................... F16M 13/00 248/278.1 |
| 7,946,542 | B1 | * | 5/2011 | Chapman ............ B60R 11/0252 248/122.1 |
| 7,995,331 | B2 | * | 8/2011 | Seitz .................... B23Q 1/0045 248/278.1 |
| 8,079,312 | B2 | | 12/2011 | Long |
| 8,098,488 | B2 | * | 1/2012 | Lewandowski ....... G06F 1/1632 361/679.41 |
| 8,322,801 | B2 | * | 12/2012 | Yang ..................... F16B 5/0642 312/222 |
| 8,746,645 | B2 | | 6/2014 | Knych |
| 8,929,065 | B2 | * | 1/2015 | Williams ............. G06F 1/1632 361/679.41 |
| 9,132,787 | B2 | * | 9/2015 | Cooper .................... B60R 11/02 |
| 9,310,841 | B2 | * | 4/2016 | Williams ............. G06F 1/1632 |
| 2001/0003961 | A1 | | 6/2001 | Hodge et al. |
| 2001/0042812 | A1 | | 11/2001 | Perzewski |
| 2003/0001064 | A1 | | 1/2003 | Book |
| 2006/0060113 | A1 | | 3/2006 | Chang |
| 2009/0084291 | A1 | | 4/2009 | Long |
| 2009/0127418 | A1 | | 5/2009 | Wang |
| 2009/0173866 | A1 | | 7/2009 | Huang |
| 2010/0127143 | A1 | * | 5/2010 | Karmazyn .......... A47B 21/0314 248/224.8 |
| 2010/0219320 | A1 | | 9/2010 | Knych |
| 2010/0288902 | A1 | | 11/2010 | Liu |
| 2011/0056412 | A1 | | 3/2011 | Grammer et al. |
| 2011/0126739 | A1 | | 6/2011 | Korpi |
| 2011/0235250 | A1 | | 9/2011 | Burgess et al. |
| 2012/0210914 | A1 | | 8/2012 | Hamilton et al. |
| 2012/0223200 | A1 | | 9/2012 | Cooper |
| 2012/0261541 | A1 | | 10/2012 | Lai |
| 2017/0020281 | A1 | * | 1/2017 | Demski ............... B60R 11/0252 |

OTHER PUBLICATIONS

Datalux Tracer Keyboard Features, Website pages describing Datalux Tracer Keyboard, available at least as early as Mar. 1, 2010, 4 pgs.

Gamber-Johnson Installation Instructions Form # INST4, Sep. 4, 1997, 2 pgs.

Gamber-Johnson Part Drawings for Keyboard 2 Mount, available at least as early as Mar. 1, 2010, 3 pgs.

Gamber-Johnson Part Drawings for Keyboard 3 Mount, available at least as early as Mar. 1, 2010, 3 pgs.

Havis Keyboard Mounting Tray for Panasonic, Website pages describing Havis Keyboard Mounting Tray Part # C-3329-PAN, available at least as early as Mar. 1, 2010, 3 pgs.

Havis Quick Release Slide for Panasonic Keyboard, Website pages describing Havis Quick Release Keyboard Part # C-KBM-103, available at least as early as Mar. 1, 2010, 2 pgs.

Havis—Shields New Product Supplement, Jun. 1, 2006, pp. 12-14.

Southco R4 Push-to-Close Latch, Southco Product Catalog, pp. 122 and 125, available at least as early as Mar. 1, 2010.

Illinois Lock Company 1940A Pushbutton Slam Lock, https://www.youtube.com/watch?v=7LJI6dtkCpY, Screenshots (Published Nov. 29, 2012).

Industrilas 7-Pin "Slam Latch" Tubular Push Button Cam Lock, http://katalog.industrilas.se/docs/us/p2-741.pdf, 1 page (Published at least as early as Dec. 31, 2014).

Southco Push-to-Close Latch, http://www.southco.com/static/Literature/93.en.pdf, 4 pages (Admitted Prior Art—Published at least as early as Jul. 22, 2015).

* cited by examiner

KEYBOARD MOUNTING ASSEMBLY

BACKGROUND

The present invention relates to an apparatus for mounting a keyboard to a support member.

There are numerous applications in which a computer keyboard can be mounted to a support structure. One such application is keyboards that are used in vehicles.

SUMMARY

In one aspect, the invention provides a keyboard mounting assembly including a base having a base upper surface and a downwardly-extending base skirt adjacent at least one side of the base upper surface. The base skirt has a recessed portion offset inwardly from a peripheral edge of the base upper surface. The assembly further includes a keyboard tray having a support portion configured to support a keyboard, the support portion having a tray upper surface and a downwardly-extending tray skirt adjacent at least one peripheral edge of the tray upper surface. The keyboard tray at least partially defines a cavity into which the base can removably nest. The tray skirt has a projection extending inwardly from an interior surface of the tray skirt and configured for receipt within the recessed portion of the base skirt when the base is nested within the cavity defined by the keyboard tray. The assembly further includes an interlock mechanism between the base and the keyboard tray and operable to releasably secure the base within the cavity of the keyboard tray.

In another aspect, a keyboard mounting assembly includes a base having a base upper surface and a downwardly-extending base skirt extending along at least a portion of one peripheral edge of the base upper surface. The base skirt has an opening along a portion of the base skirt underneath the base upper surface. The assembly further includes a keyboard tray having a support portion configured to support a keyboard. The support portion has a tray upper surface and a downwardly-extending tray skirt extending along at least a portion of one peripheral edge of the tray upper surface. The tray skirt has a projection extending inwardly from an interior surface of the tray skirt and configured for receipt within the opening of the base skirt when the base is coupled to the keyboard tray. The projection is formed underneath the tray upper surface. The assembly further includes an interlock mechanism between the base and the keyboard tray and operable to releasably secure the base with the keyboard tray.

In a further aspect, a keyboard mounting assembly includes a base having a base upper surface and a base lower surface opposite the base upper surface. The base upper surface and the base lower surface define at least one peripheral edge of the base. The assembly further includes a keyboard tray having a support portion configured to support a keyboard, the support portion having a tray upper surface and a tray lower surface. The tray upper surface and the tray lower surface define at least one peripheral edge of the keyboard tray. The keyboard tray further includes a projection spaced from the tray lower surface and extending inwardly from the peripheral edge of the keyboard tray to define a space with the tray lower surface that is configured to receive the at least one peripheral edge of the base. The projection defines a pivot axis about which the keyboard tray pivots relative to the base for coupling the keyboard tray to the base. The assembly further includes an interlock mechanism between the base and the keyboard tray and operable to releasably secure the base with the keyboard tray.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
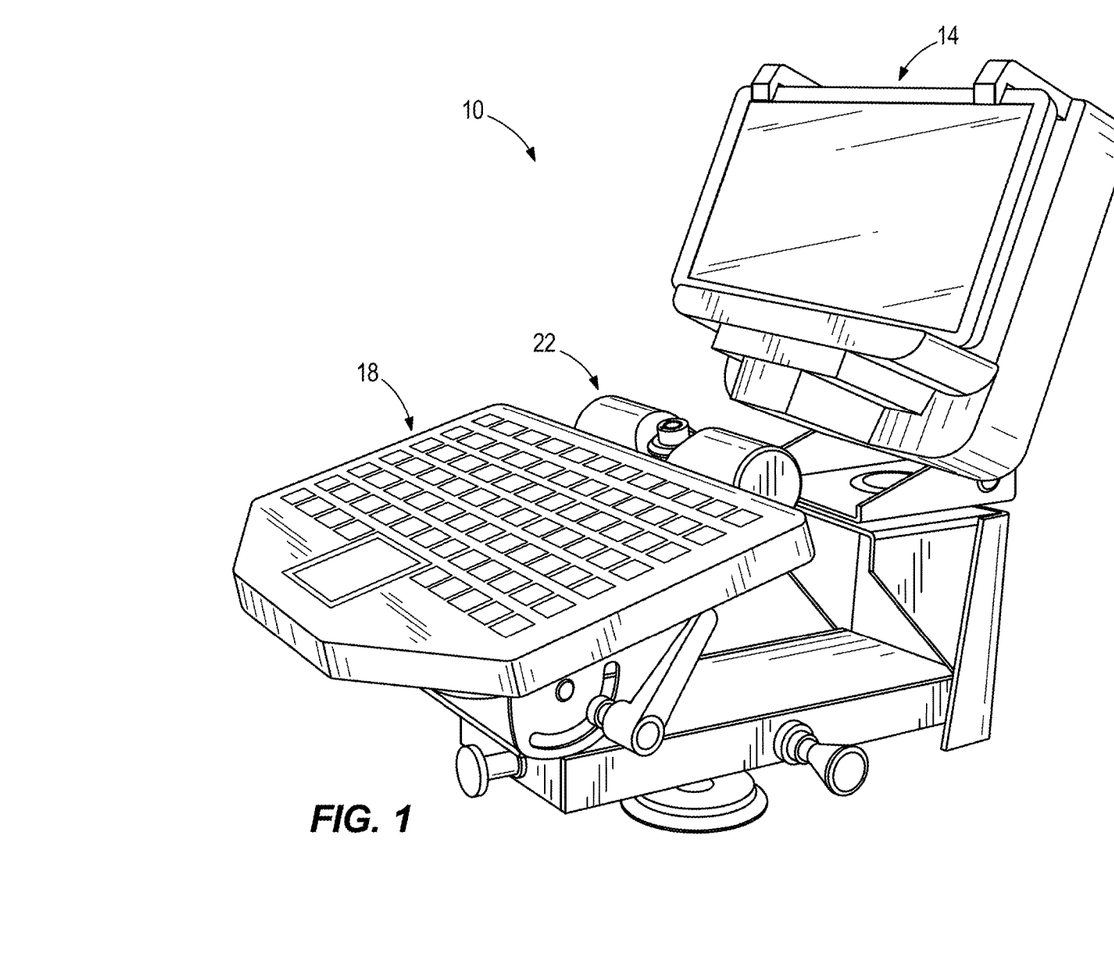
FIG. 1 is a perspective view of a support arrangement for supporting a tablet computer and a keyboard in a vehicle, the support arrangement including a keyboard mounting assembly embodying the invention.

FIG. 1 illustrates a support arrangement 10 for supporting a tablet computer (or similar electronic device) 14 and a keyboard 18 in a vehicle. Similar support arrangements are also known for securing computers 14 and keyboards 18 to mobile carts or stands, or to desks, walls, and the like. The illustrated support arrangement 10 includes a keyboard mounting assembly 22 for removably securing the keyboard 18 to the support arrangement 10. In many cases, it is desirable to quickly and easily remove the keyboard 18 (e.g., a wireless keyboard or a keyboard having a long cable) from the support arrangement 10 for more convenient or ergonomic use. The keyboard 18 should also be easily re-installed onto the support arrangement 10. The illustrated keyboard mounting assembly 22 facilitates such removal and re-installation, as will be described in detail below.

Figure 2:
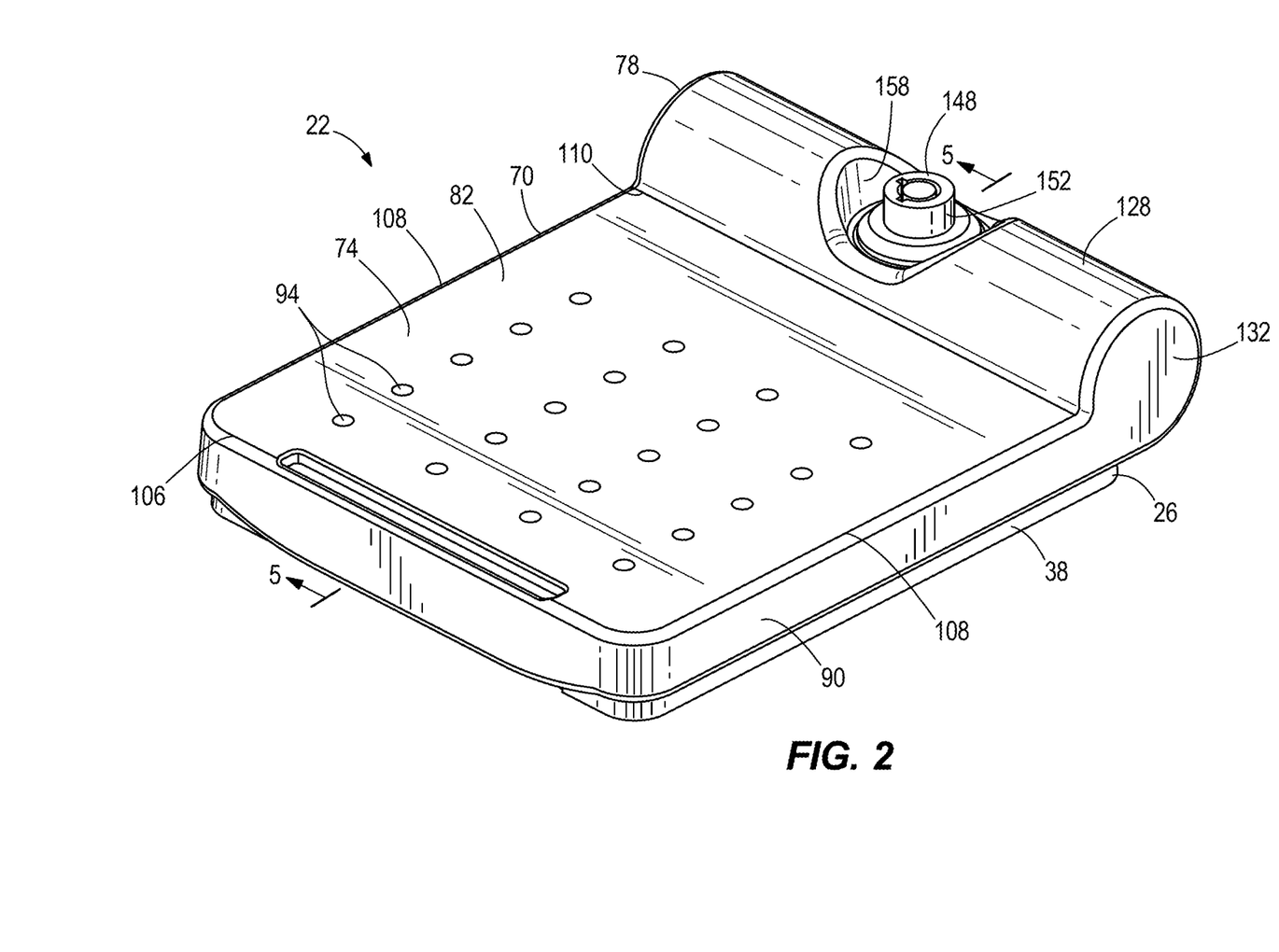
FIG. 2 is a perspective view of the keyboard mounting assembly of FIG. 1, shown in a latched and secured orientation.
Figure 3:
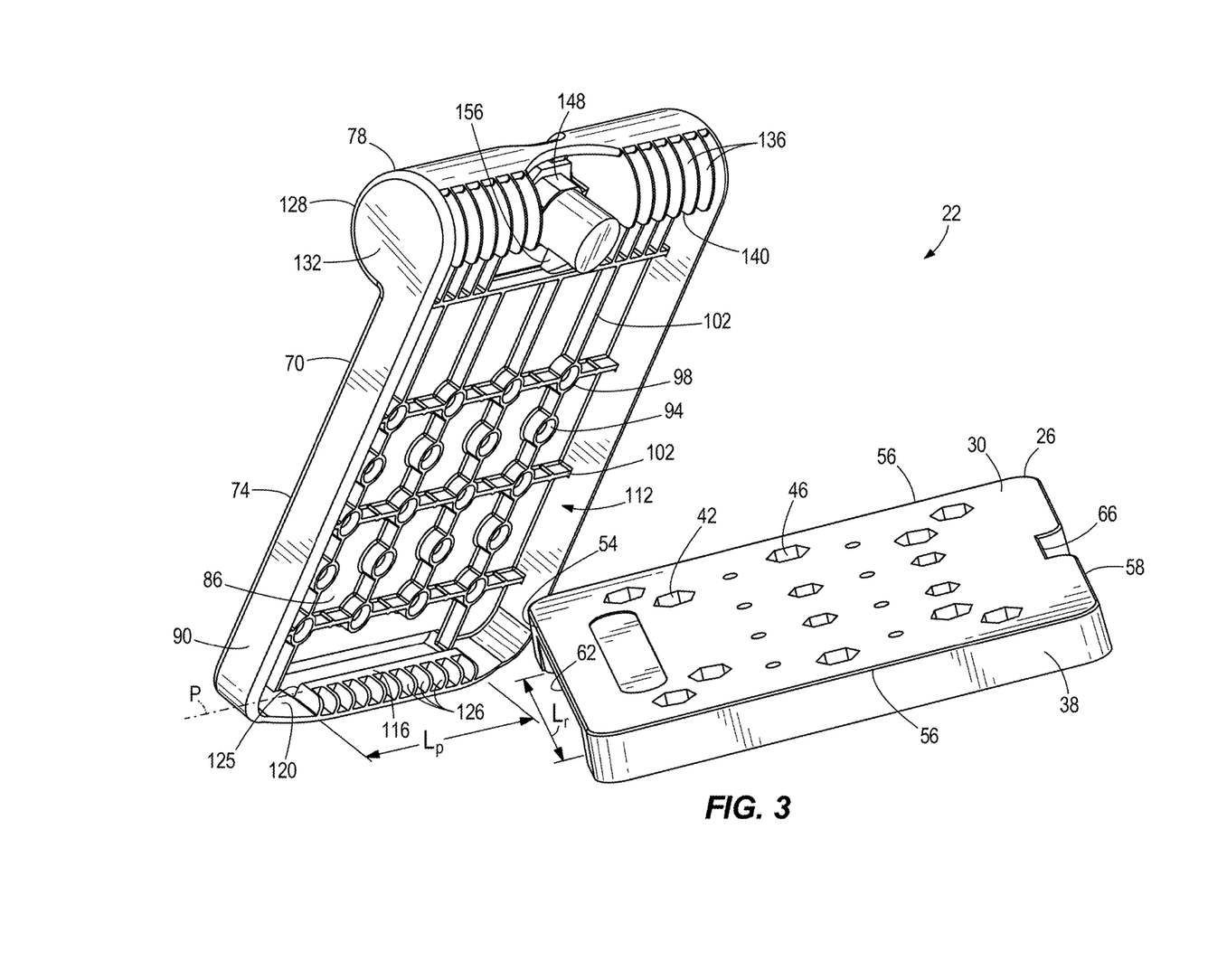
FIG. 3 is an exploded view of the base and the keyboard tray of the keyboard mounting assembly of FIG. 2.
Figure 4:
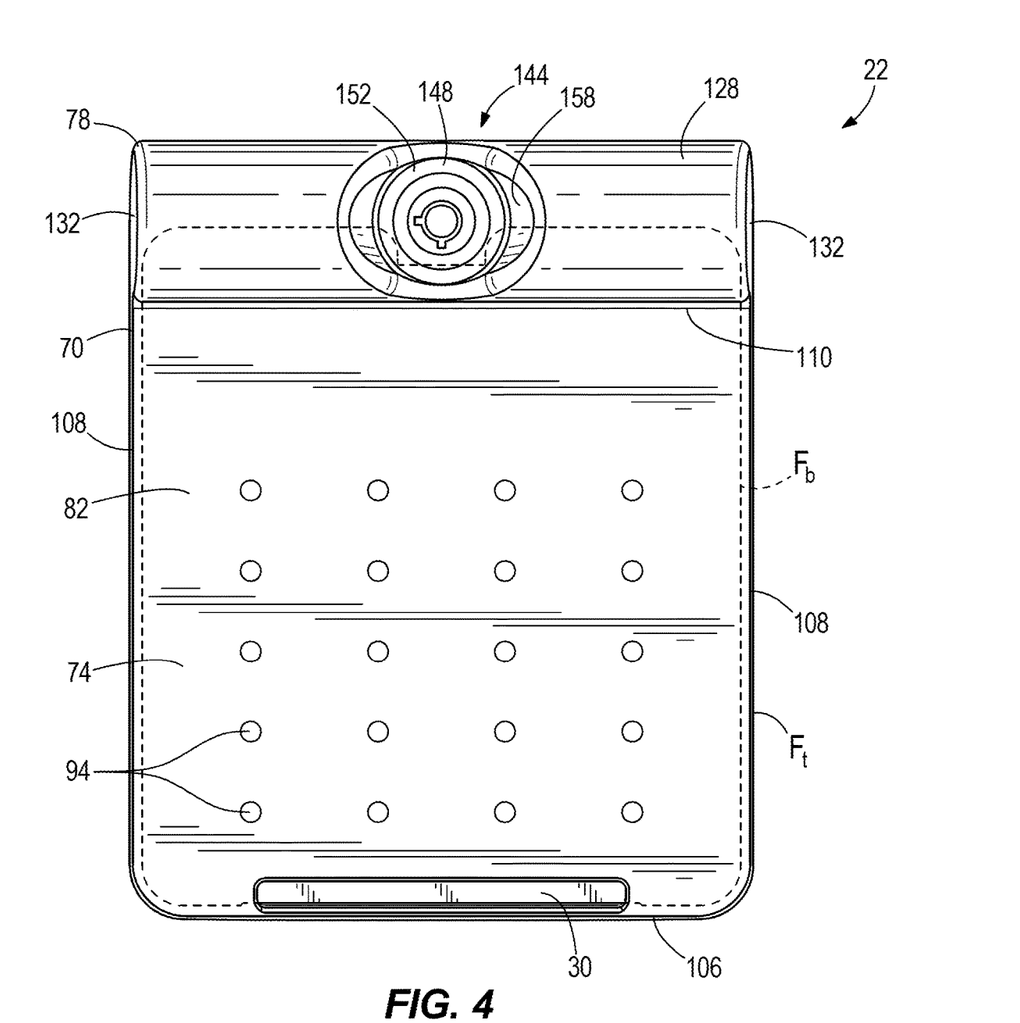
FIG. 4 is a front view of the keyboard mounting assembly of FIG. 2.
Figure 5:
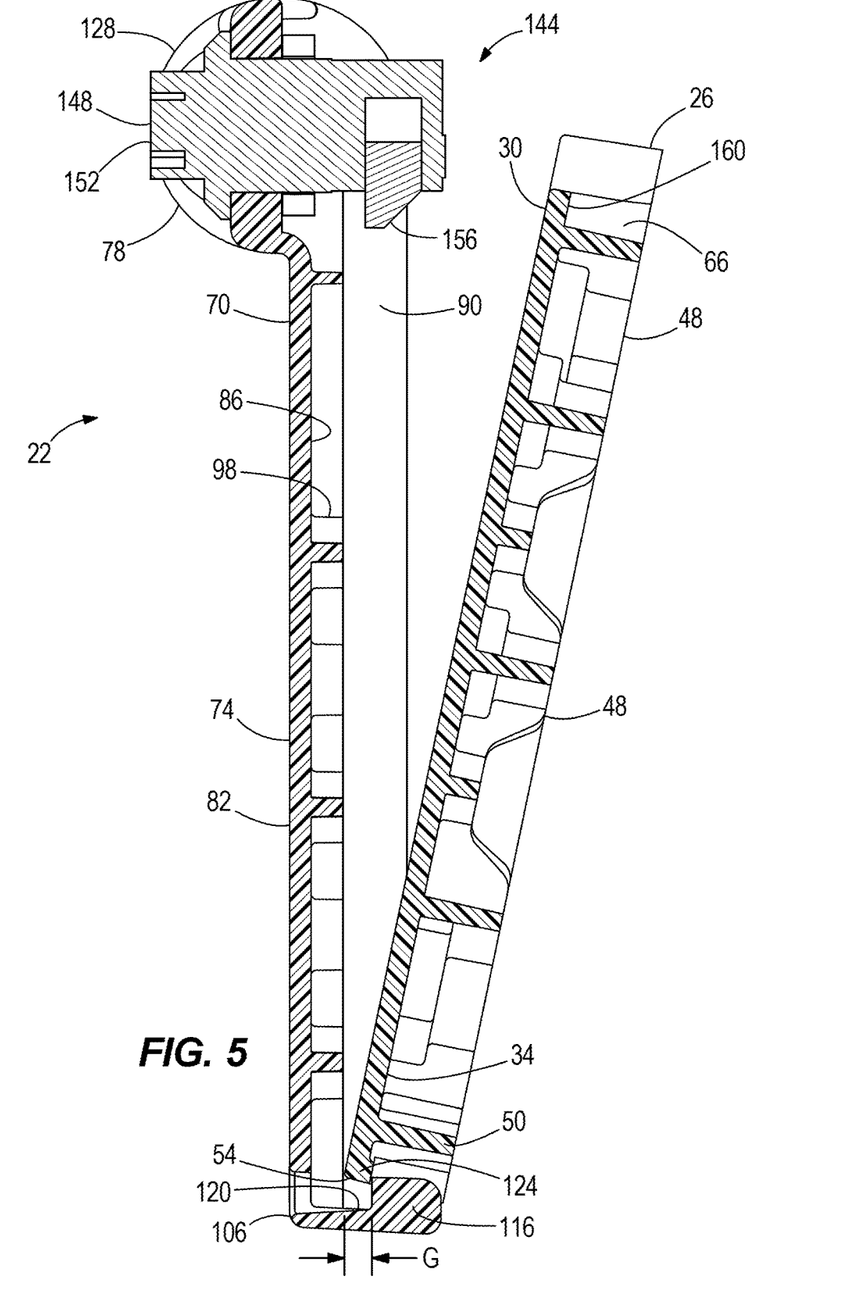
FIG. 5 is a section view illustrating an initial interconnection of the base and the keyboard tray for installation of the keyboard tray onto the base.
Figure 6:
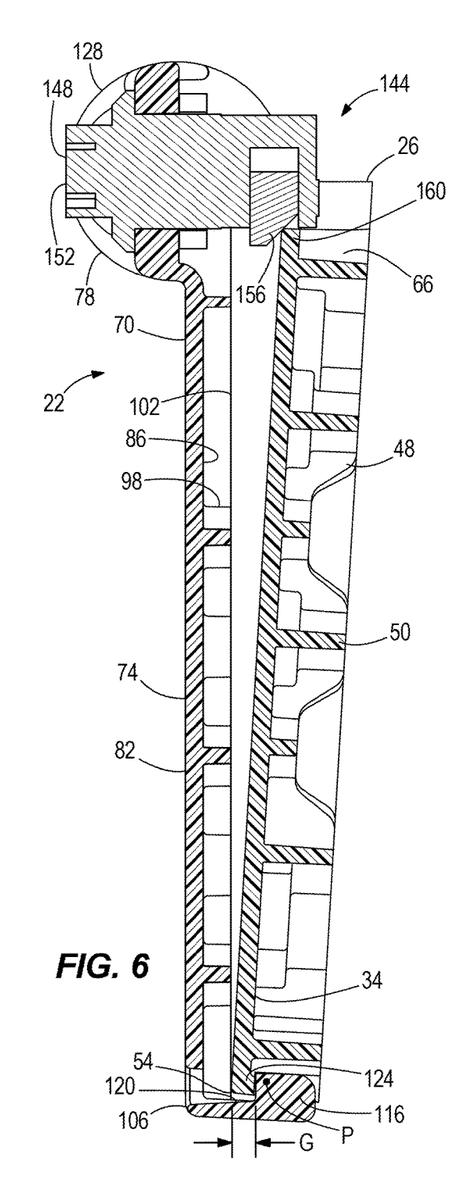
FIG. 6 is a section view illustrating the keyboard tray pivoted further relative to the base during installation of the keyboard tray onto the base.
Figure 7:
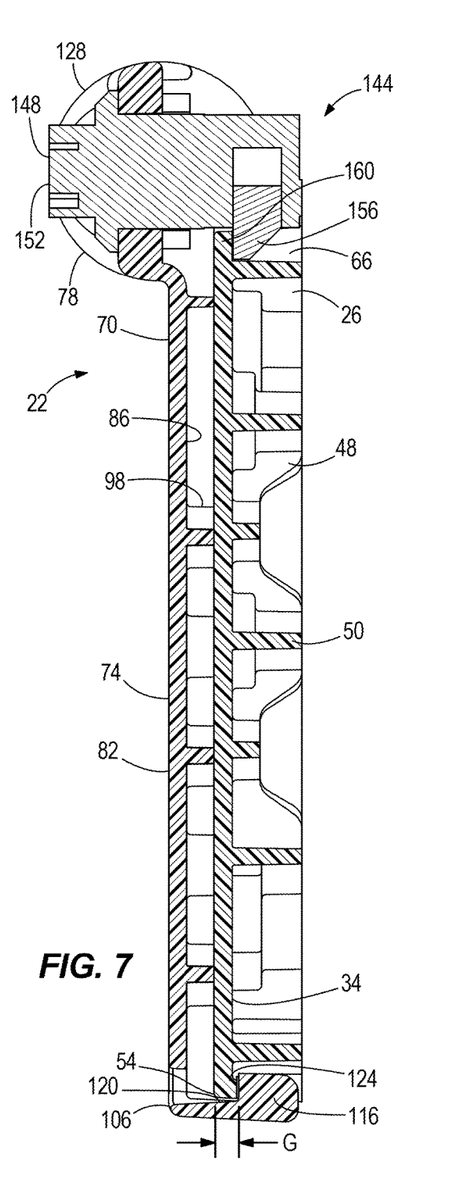
FIG. 7 is a section view illustrating the keyboard tray installed and secured to the base.

With reference to FIGS. 2-7, the keyboard mounting assembly 22 includes a base 26 having a generally planar base upper surface 30, a base lower surface 34 opposite the upper surface 30, and a base skirt 38 extending downwardly from the base upper surface 30. Apertures 42 extend between the base upper surface 30 and the base lower surface 34 for mounting the base 26 to the support arrangement 10. As shown in FIG. 3, the apertures 42 may be circular and may also include polygonal counterbores 46 (e.g., hexagonal) formed in the base upper surface 30 to receive mounting hardware (e.g., hex-head fasteners or nuts) for mounting the base 26 to the support arrangement 10. The apertures 42 can be provided in any desired pattern or arrangement, and will typically conform to standardized mounting hole patterns. As best seen in FIGS. 5-7, bosses 48 aligned with some or all of the apertures 42 extend from the base lower surface 34 to provide added strength to the base 26 and added guidance for the fasteners extending through the apertures 42. Ribs 50 can also be provided on the base lower surface 34 to increase the strength and rigidity of the base 26.

As best seen in FIG. 3, the base skirt 38 extends downwardly from the base upper surface 30 along at least one, and in the illustrated embodiment, along all peripheral edges of the base upper surface 30. The illustrated base 26 is generally rectangular in shape to have a first or bottom peripheral edge 54, second and third opposed side peripheral edges 56, and a fourth or top peripheral edge 58 opposite bottom peripheral edge 54. As used herein and in the appended claims, directional orientation terms such as top, bottom, side, upper, lower, etc. are used for illustrative purposes only, and are used in relation to the orientation of the keyboard 18 as shown mounted in FIG. 1. In other embodiments, the base 26 may take other shapes. Adjacent the bottom peripheral edge 54, the base skirt 38 has a recessed portion 62 offset inwardly from the bottom peripheral edge 54. Adjacent the top peripheral edge 58, the base skirt 38 has another recessed portion 66 offset inwardly from the top peripheral edge 58. The base upper surface 30 and the base lower surface 34 each extend outwardly beyond the recessed portions 62, 66, such that the recessed skirt portions 62 and 66 are underneath both the base upper surface 30 and the base lower surface 34, for reasons that will be described further below. In other words, the base upper surface 30 and the base lower surface 34, and thus portions of the bottom and top peripheral edges 54, 58, overhang the recessed portions 62, 66 of the base skirt 38. The illustrated base 26 is a single piece made from injection-molded plastic (e.g., polycarbonate and ABS materials). In other embodiments, the base 26 can be made of metal or other materials and made from several parts assembled together.

The keyboard mounting assembly 22 further includes a keyboard tray 70 having a support portion 74 configured to support the keyboard 18, and a handling portion 78 adjacent (e.g., above) the support portion 74. The support portion 74 includes a generally planar tray upper surface 82, a tray lower surface 86 opposite the tray upper surface 82, and a tray skirt 90 extending downwardly from the tray upper surface 82. Apertures 94 extend between the tray upper surface 82 and the tray lower surface 86 for mounting the keyboard 18 to the keyboard tray 70. The apertures 94 can be provided in any desired pattern or arrangement to facilitate mounting the keyboard 18 thereto, and will typically conform to standardized mounting hole patterns. As best seen in FIGS. 3 and 5-7, bosses 98 aligned with some or all of the apertures 94 extend from the tray lower surface 86 to provide added strength to the tray 70 and added guidance for the fasteners extending through the apertures 94. The bosses 98 are countersunk in the bottom to accept flat-head screws inserted through the bosses 98 and into the underside of the keyboard 18. Ribs 102 can also be provided on the tray lower surface 86 to increase the strength and rigidity of the tray 70.

The tray skirt 90 extends downwardly from the tray upper surface 82 along at least one, and in the illustrated embodiment, along three peripheral edges of the tray upper surface 82. The illustrated support portion 74 of the tray 70 is generally rectangular in shape to conform to the shape of the base 26. The tray upper surface 82 has a first or bottom peripheral edge 106, second and third opposed side peripheral edges 108, and a fourth or top peripheral edge 110 opposite bottom peripheral edge 106 that, in the illustrated embodiment, extends along and defines the intersection of the support portion 74 and the handling portion 78. In other embodiments, the tray 70 may take other shapes, but should generally conform to the shape of the base 26. The illustrated tray skirt 90 extends downwardly from each of the bottom and side peripheral edges 106, 108 to at least partially define a cavity 112 (see FIG. 3) into which the base 26 is received to removably nest.

Adjacent the bottom peripheral edge 106, the tray skirt 90 has a projection 116 extending inwardly from an interior surface 120 of the tray skirt 90 underneath both the tray upper and lower surfaces 82, 86, and therefore also extending inwardly from the bottom peripheral edge 106. The projection 116 is configured to be received within the recessed portion 62 of the base skirt 38, along the bottom peripheral edge 54 of the base 26, when the base 26 is nested within the cavity 112. To state it another way, the recessed portion 62 of the base skirt 38 defines an opening along a portion of the base skirt 38 into which the projection 116 is received. The illustrated projection 116 has a projection length Lp corresponding to a length Lr of the recessed portion 62 (or opening) of the base skirt 38, such that engagement or inter-engagement between the projection 116 and the recessed portion or opening 62 of the base skirt 38 aligns the base 26 relative to the tray 70 to assist in nesting the base 26 within the cavity 112 in the tray 70. The projection 116 is also spaced apart from the tray lower surface 86, and more specifically from the lowest surfaces of the bosses 98 and ribs 102, to define a space or gap G (see FIGS. 5-7) between the projection 116 and the lowest surfaces of the bosses 98 and ribs 102. The gap G is sized to receive the bottom peripheral edge 54 of the base 26, and specifically the portion of the bottom peripheral edge 54 that overhangs the recessed portion 62 of the base skirt 38. The length of the gap G is only slightly larger than the distance between the base upper surface 30 and the base lower surface 34 to facilitate a tight fight when the base 26 is nested within the cavity 112 (see FIG. 7). In the nested condition, the projection 116 abuts the base lower surface 34 to prevent removal of the base 26 from within the cavity 112. The base lower surface 34 can include a lip or built-up portion 124 adjacent the recessed portion 62 (see FIGS. 5-7) that renders the thickness between the base upper surface 30 and the base lower surface 34 at the lip 124 slightly thicker than the thickness between the base upper and lower surfaces 30, 34 over the remainder of the base 26. This lip 124 facilitates the snug fit within the gap G. While the illustrated projection 116 is shown as having a wall 125 and a plurality of ribs 126, other configurations and constructions of the projection 116 can be substituted.

The handling portion 78 of the tray 70 extends from the top peripheral edge 110, and in the illustrated embodiment is generally cylindrical in shape to facilitate grasping and otherwise handling the tray 70, especially when a keyboard 18 is mounted thereon. The handling portion 78 has an arcuate upper surface 128 and sidewalls 132 extending downwardly from both lateral ends of the upper surface 128. The sidewalls 132 blend seamlessly into the tray skirt 90 on both sides. As best seen in FIG. 3, the underside of the handling portion 78 is generally hollow but includes a plurality of ribs 136 for strengthening and providing rigidity to the handling portion 78. In addition, the ribs 136 further define the upper boundary of the cavity 112 into which the base 26 nests. The ribs 136 are stepped such that step faces 140 of the ribs 136 abut the portion of the base skirt 38 adjacent the upper peripheral edge 58, when the base 26 is nested within the cavity 112 (see FIG. 7). In other embodiments, other features on the underside of the handling portion 78 can be substituted for the ribs 136 and step faces 140 to define the upper boundary of the cavity 112. The illustrated tray 70 is a single piece made from injection-molded plastic (e.g., polycarbonate and ABS materials). In other embodiments, the tray 70 can be made of metal or other materials and made from several parts assembled together.

The keyboard mounting assembly 22 further includes an interlock mechanism 144 between the base 26 and the tray 70 for releasably securing the base 26 to the tray 70. In the illustrated embodiment, the interlock mechanism 144 includes a lock 148 supported by the keyboard tray 70 on the handling portion 78. The illustrated lock 148 is a keyed button lock in which, in an unlocked state, a button 152 can be depressed to retract a pawl 156, and in a locked state, the button 152 cannot be depressed to retract the pawl 156. The button 152 is positioned in a recessed portion 158 of the arcuate upper surface 128, such that the button 152 does not extend substantially above the upper arcuate surface 128, and such that a user's finger or thumb fits easily into position on the handling portion 78 while depressing the button 152. The interlock mechanism 144 also includes a flange 160 defined by the overhanging portion of the upper peripheral edge 58 of the base 26 that is positioned adjacent to the recessed portion 66 of the base skirt 38. As best shown in FIGS. 5-7, this flange 160 interacts with the pawl 156 to secure the base 26 within the tray cavity 112. The recessed portion 66 of the base skirt 38 also provides clearance for the cylinder or housing of the lock 148.

Operation of the keyboard mounting assembly 22 will now be described. Once the base 26 has been mounted to the desired support member 10, and the keyboard 18 has been secured to the keyboard tray 70 via fasteners, a user can install the keyboard tray 70 to the base 26 to achieve the engaged position. As shown in FIG. 5, the user aligns the tray 70 to the base 26 as facilitated by the generally conforming tray skirt 90 and base skirt 38. With the tray 70 pivoted relative to the base 26 at the general angle shown in FIG. 5, the user can engage the projection 116 into the recessed portion 62 of the base skirt 38 so that the lower peripheral edge 54 of the base 26 that is adjacent the recessed portion 62 enters into the gap G between the projection 116 and the tray lower surface 86 (and more specifically the lowest surfaces of the bosses 98 and ribs 102). The corresponding lengths Lp and Lr of the projection 116 and recessed portion 62, respectively, further facilitate proper alignment between the base 26 and the tray 70.

With the initial engagement shown in FIG. 5 achieved, the user then pivots the tray 70 relative to the base 26 about a pivot axis P (see FIGS. 3 and 6) that is defined by the projection 116. The engagement between the projection 116 and the base lower surface 34 (the lip 124 in the illustrated embodiment) provides a smooth pivoting motion, and the tray skirt 90 and the base skirt 38 guide the pivoting to maintain lateral alignment. As pivoting occurs, the upper peripheral edge 58 of the base moves relatively closer to the tray lower surface 86, and ultimately toward the engaged nested position. The flange 160 engages the pawl 156, and due to the cammed surface of the pawl 156, automatically retracts the pawl 156 into the lock 148 as the tray 70 pivots relative to the base 26. With continued pivoting, the flange eventually moves past the retracted pawl 156, thereby allowing the pawl 156 to extend, snap over, and capture the flange 160 to secure the tray 70 relative to the base 26, with the base 26 now nested within the cavity 112 of the tray 70, as shown in FIG. 7. No manual inter-engagement or manipulation of fasteners is required to achieve the engaged position.

As seen in FIGS. 2 and 7, when the tray 70 and the base 26 are secured together, the portions of the tray skirt 90 extending from the bottom and side peripheral edges 106, 108 at least partially overlap the corresponding portions of the base skirt 38 extending from the bottom and side peripheral edges 54, 56. In the illustrated embodiment, there is engagement between the tray skirt 90 and the base skirt 38 that provides a snug fit to minimize relative lateral movement between the tray 70 and the base 26. To further minimize relative movement in a direction normal to the tray upper surface 82, the bosses 98 and the ribs 102 on the tray lower surface 86 have a height configured to achieve engagement between lower surfaces of the bosses 98 and ribs 102 and the base upper surface 30 when the base is nested and secured in the tray cavity 112.

With reference to FIG. 4, when the base 26 is securely nested within the tray cavity 112, a footprint Fb defined by the outermost perimeter of the base 26, as viewed in a direction normal to the tray upper surface 82, is completely contained within a footprint Ft defined by the outermost perimeter of the tray 70, as viewed in the same direction normal to the tray upper surface 82. This provides a compact and ergonomic design.

To remove the tray 70 from the base 26, the user, needing only one hand, can grasp the handling portion and press the button 152 of the unlocked lock 148 to retract the pawl 156. With the pawl 156 retracted, the flange 160 is no longer captured by the pawl 156 and the top of the tray 70 is free to pivot away from the top of the base 26 toward the position shown in FIG. 5. To completely disengage the tray 70 from the base 26, the tray 70 is moved such that the bottom peripheral edge 54 of the base 26 is removed from the gap G and the tray skirt 90 no longer overlaps or engages the base skirt 38.

Various features and advantages of the invention are set forth in the following claims.

What is claimed is:

1. A keyboard mounting assembly comprising:
 a base having a base upper surface, a base lower surface and a downwardly-extending base skirt adjacent at least one side of the base upper surface, the base skirt having a recessed portion extending inwardly from a peripheral edge of the base upper surface, wherein the base includes at least one aperture extending between the base upper surface and the base lower surface for mounting the base to a support arrangement;
 a keyboard tray having a support portion configured to support a keyboard, the support portion having a tray upper surface and a tray lower surface with at least one aperture extending between the tray upper surface and the tray lower surface for mounting the keyboard to the keyboard tray, and a downwardly-extending tray skirt adjacent at least one peripheral edge of the tray upper surface, the keyboard tray at least partially defining a keyboard tray cavity configured for removable nesting of the base therein, wherein the tray skirt extends below the base lower surface when the base is removably nested in the keyboard tray cavity and the tray skirt has a projection extending inwardly from an interior surface of the tray skirt, the projection being configured for receipt within the recessed portion of the base skirt when the base is removably nested within the keyboard tray cavity; and
 an interlock mechanism between the base and the keyboard tray, the interlock mechanism operable to releasably lock the base within the keyboard tray cavity, wherein when the base is locked within the keyboard tray cavity, the base is configured to prevent the keyboard from being removed from the tray upper surface.

2. The keyboard mounting assembly of claim 1, wherein the projection abuts the base lower surface to prevent removal of the base from within the keyboard tray cavity when the interlock mechanism releasably locks the base within the keyboard tray cavity.

3. The keyboard mounting assembly of claim 1, wherein the projection defines a pivot axis and the keyboard tray is configured to pivot about the pivot axis relative to the base to nest and secure the base within the keyboard tray cavity, and to remove the base from within the keyboard tray cavity.

4. The keyboard mounting assembly of claim 1, wherein the projection has a length corresponding to a length of the recessed portion of the base skirt such that an engagement between the projection and the recessed portion of the base skirt aligns the base relative to the keyboard tray for nesting the base within the keyboard tray cavity.

5. The keyboard mounting assembly of claim 1, wherein the base skirt extends from at least three sides of the base upper surface and the tray skirt extends from at least three corresponding sides of the tray upper surface, such that when the base is nested within the keyboard tray cavity, the at least three sides of the tray skirt at least partially overlap the at least three corresponding sides of the base skirt.

6. The keyboard mounting assembly of claim 5, wherein the base skirt further extends from a fourth side of the base upper surface, and wherein the keyboard tray further includes a feature that engages the fourth side of the base skirt when the base is nested within the keyboard tray cavity.

7. The keyboard mounting assembly of claim 6, wherein the feature is one or more ribs formed on an underside of the keyboard tray.

8. The keyboard mounting assembly of claim 1, wherein the interlock mechanism includes a lock supported by the keyboard tray adjacent the support portion, and wherein the base includes a flange configured to engage and be retained by a pawl of the lock when the base is nested within the keyboard tray cavity defined by the keyboard tray.

9. The keyboard mounting assembly of claim 1, wherein the keyboard tray includes ribs formed on an underside of the tray upper surface, the ribs sized to engage the base upper surface when the base is nested within the keyboard tray cavity.

10. The keyboard mounting assembly of claim 1, wherein the base defines a base perimeter footprint, as viewed in a direction perpendicular to the base upper surface, and the keyboard tray defines a tray perimeter footprint, as viewed in a direction perpendicular to the tray upper surface, and wherein when the base is nested within the keyboard tray cavity, the base perimeter footprint is completely contained within the tray perimeter footprint.

11. The keyboard mounting assembly of claim 1, wherein when the base is locked within the keyboard tray cavity, the base upper surface is spaced apart from the tray lower surface.

\* \* \* \* \*